Figure 3:
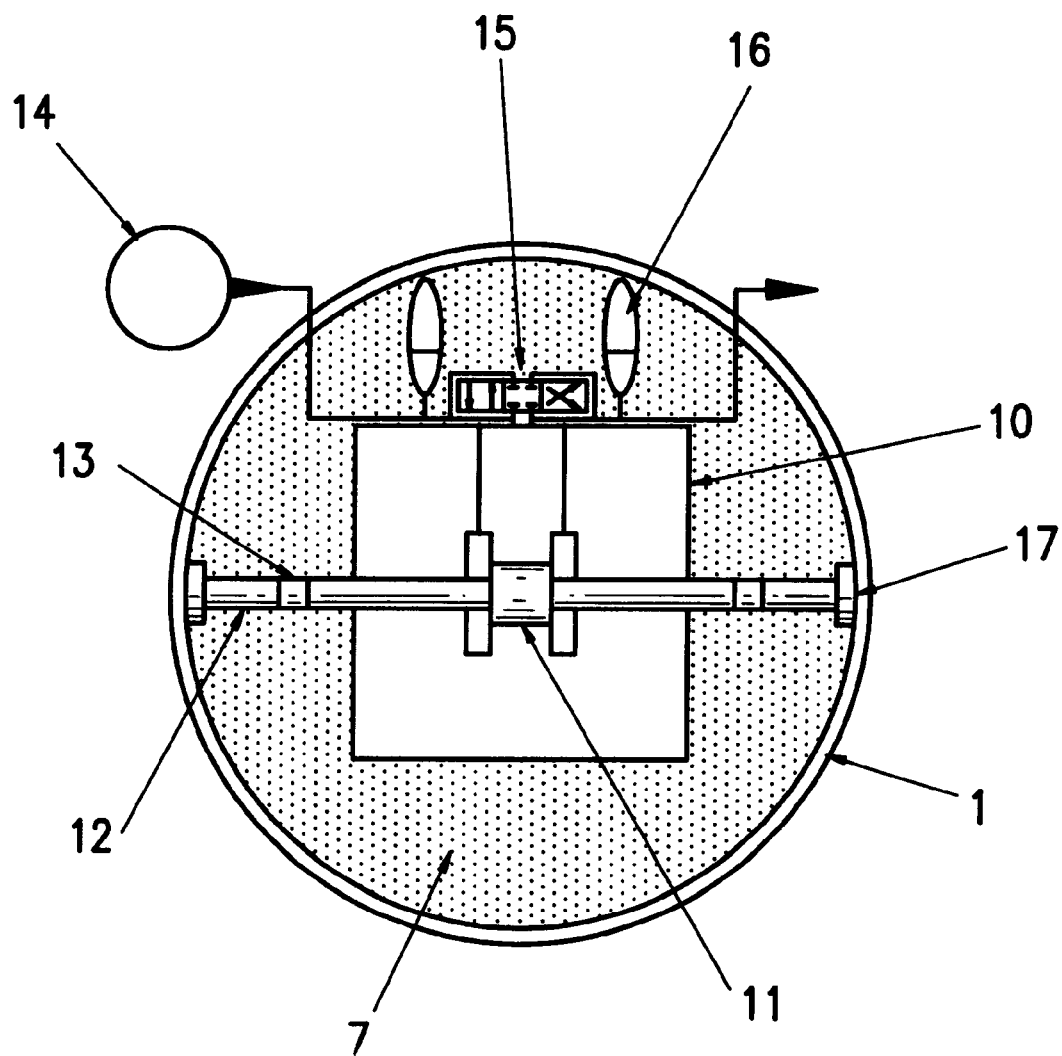

United States Patent [19]
Lieng et al.

[11] Patent Number: 6,105,712
[45] Date of Patent: Aug. 22, 2000

[54] METHOD FOR GENERATING SEISMIC SHEARING WAVES IN A SUBTERRANEAN FORMATION

[75] Inventors: Jon Tore Lieng; Egil Tjaaland, both of Trondheim, Norway

[73] Assignee: Leiv Eiriksson Nyfotek AS, Trondheim, Norway

[21] Appl. No.: 09/269,169

[22] PCT Filed: Sep. 22, 1997

[86] PCT No.: PCT/NO97/00256

§ 371 Date: May 4, 1999

§ 102(e) Date: May 4, 1999

[87] PCT Pub. No.: WO98/13707

PCT Pub. Date: Apr. 2, 1998

[30] Foreign Application Priority Data

Sep. 24, 1996 [NO] Norway ..................................... 964026

[51] Int. Cl.$^7$ ........................................................ G01V 1/04
[52] U.S. Cl. ............................... 181/114; 181/121; 367/75
[58] Field of Search ................................. 367/31, 75, 189; 181/106, 113, 121, 114

[56] References Cited

U.S. PATENT DOCUMENTS

| | | | |
|---|---|---|---|
| 4,310,066 | 1/1982 | Won | 181/121 |
| 4,867,096 | 9/1989 | Cole | 181/114 |
| 5,128,906 | 7/1992 | Cole | 36/143 |

*Primary Examiner*—Christine K. Oda
*Assistant Examiner*—Anthony Jolly
*Attorney, Agent, or Firm*—Dennison, Scheiner, Schultz & Wakeman

[57] ABSTRACT

Method for generating seismic intersection waves in an underground formation, wherein poles that are previously driven into the formation for other purposes or poles that are driven down for this purpose, said poles being used as a transfer medium for the intersection waves into the formation. The poles are put into transversal vibration by means of an oscillating mass, the oscillations being suitable for forming mainly horizontal polarized waves. In order to achieve a best possible impression of the formation, transversal waves may be generated in a first direction in a first period of time, and a second direction, different from the first direction, in a second period of time. Alternatively, the oscillating mass can be arranged to swing parallel to the pole in order to be able to generate pressure waves. The poles can be equipped with a "skirt", and/or with radially extending flanges in order to secure the best possible attachment in loose formations. If desired, it is also possible to introduce an artificial under pressure in the pole, in order to safeguard against over pressure around the pole when it is vibrating.

6 Claims, 5 Drawing Sheets

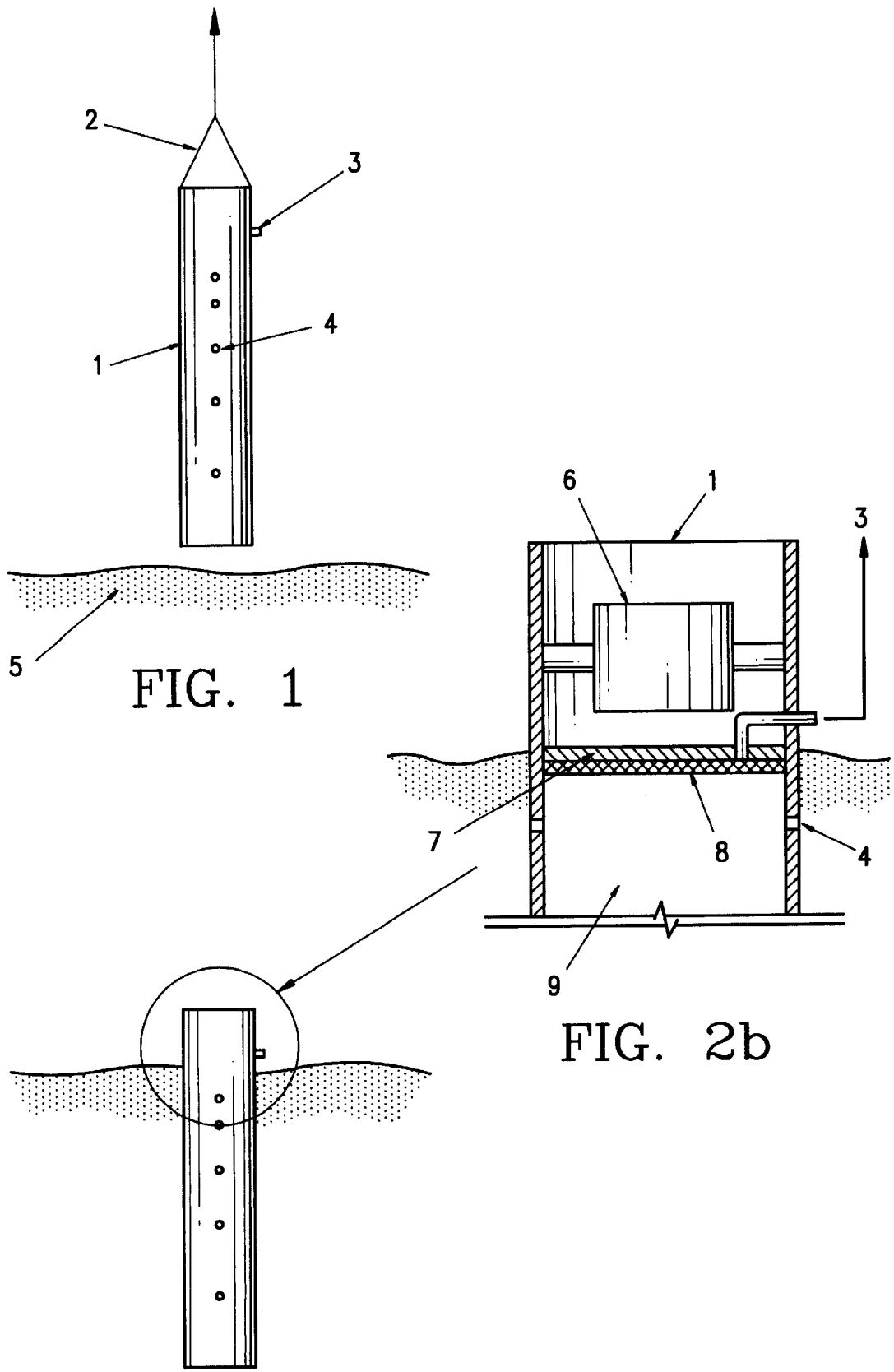

METHOD FOR GENERATING SEISMIC SHEARING WAVES IN A SUBTERRANEAN FORMATION

The present invention concerns seismic wave generation in earth and is particularly adapted for generation of seismic intersection waves in earth sediments in a marine environment.

Exact determination of the extent of hydrocarbon-reservoirs and the structure in and around such a reservoir, is highly significant for increasing the rate of exploitation. To provide such information, it is necessary to have a method for transferring strong seismic intersection and pressure waves down into the earth. These waves will propagate downwards through the sediments to be reflected and transmitted in different directions due to changes in the physical properties of the rock types. Reflections are registered by one or more receivers situated in the earth or in the water.

It is relatively easy to transfer intersection and pressure waves downwards in formations below the mainland. However, in formations located under the sea there are completely different problems involved in transferring sufficiently strong intersection waves downwards into the formations during a certain period, for collecting exact information about the formation properties.

Conventional marine seismic investigations generate pressure waves (compression waves) in the sea, for example by means of a pneumatic cannon.

The conventional methods give a structural image of the earth and an estimate of the velocity of the compression wave for the different layers. However, no good quantitative indication for the fluid content is achieved by conventional techniques. This is because the velocity of the compression wave does not define a rock type uniquely. The relationship between the velocities of a compression wave and an intersection wave is a much better indicator of rock type.

If the impact velocity is known, the fluid contents and elastic parameters in the rock type can be determined by analysing the change in the reflection coefficient with varying distance between the source and the receiver.

In some formations, such as broken reservoirs, measurement of a compression wave will not show substantial parts of the reservoir, because gas above the reservoir will suppress the amplitudes and in addition lowers the velocity of the compression wave. A measurement of an intersection wave will not, however, be affected by this gas to the same degree, so that an opportunity of better mapping of the reservoir is given.

In addition to the conventional techniques a number of solutions have been proposed, involving transfer of intersection waves in order to overcome the weakness of the first mentioned methods.

Intersection waves can be generated indirectly in a marine environment by utilizing the converted energy of the intersection waves, which emerges when a compression wave hits a formation border with an angle of incidence that is not zero degrees. The generated intersection and compression waves can be registered by geophones placed in a well hole or on the surface. A problem with this method is that it is difficult to know where the wave conversion has taken place.

U.S. Pat. No. 4,867,096 describes a device for generating primary-elliptical polarized intersection waves. This device is meant to be suitable on a soft land soil or in marine conditions. The marine embodiment of the device comprises, in addition to the source of the intersection wave, a "rod" having a conical end comprising a transmission element to the rock. It is, however, clear from the description and drawing that said rod only to a limited degree is able to penetrate into the formation. Among other things this is related to what force is used to press or hit the rod down into the formation, and dimensioning and construction of the rod. For many subsea applications, the equipment described in U.S. Pat. No. 4,867,096 will be insufficient to give a good, durable anchoring of the transmission element to the seabed, which is a condition for transmitting strong intersection waves.

U.S. Pat. No. 5,128,900 and U.S. Pat. No. 5,128,906 describe corresponding devices for the generation of elliptic polarized intersection waves and normal intersection waves, respectively. It can be adapted for use in marine conditions, but as with U.S. Pat. No. 4,867,096, it will only be forced down into the formation to a limited degree. Besides, there is a need for continuous stabilizing of the device by means of a tension wire to the sea surface.

U.S. Pat. No. 4,705,137 describes a device which generates linear polarized intersection waves but will have an unstable and probably bad connection to the sea bed, as the vibrator is sunken into the bottom in the loose sediments without any form of support.

U.S. Pat. No. 4,327,814 and U.S. Pat. No. 4,219,096 both describe devices which have means of generating horizontal polarized intersection waves. U.S. Pat. No. 4,327,814 is not meant for an unconsolidated sea bed, but for swamp/land areas. U.S. Pat. No. 4,219,906 is not based on seismic impulse-generation by means of a gas explosion.

The above mentioned publications represent substantial progress in relation to the traditional pneumatic cannon technique. However, none of these gives a good solution to how strong intersection waves over a period shall be transferred to a sea bed if sediments often are loose and unconsolidated.

The main object of the invention is to provide a method that makes it possible to map subsea underground formations. More specifically, the primary object is to map quantitative content of fluid in a formation, and achieve a good picture of cracks and faults that are present in the formation.

These main objects can be reached through a system where a good contact to the bottom sediments is established and maintained over a period of time. In this way, strong intersection and pressure waves can be transferred to the formation over a long time.

More specifically, the invention comprises a method for generation of seismic intersection waves in an underground formation, characterized by th use of poles that are previously are driven into the formation for other purposes, or poles that are driven down for this purpose, which are used as a transfer medium for the intersection waves into the formation, said poles being put into transversal vibration by means of an oscillating mass, said vibrations being adapted to form mainly horizontal polarized waves. Preferred forms of embodiments are clear from the dependent claims.

In connection with oil production in marine environments, the poles will probably always be driven into the formation. The purpose therefore is to hold and stabilize bottom constructions under stress by, for example, environmental forces. In connection with a normal production field, there will normally be a substantial number of such poles.

The poles are driven down in the formation by means of a hammer. The hammer may be in the form of a pile driver that is also used on dry land. The length of the poles are such that the part of the poles that are situated under the sea bed can extend from 10 to 100 meters. Poles driven down in the formation for the above mentioned purpose will thus have a strong and durable anchoring. For the object according to the invention, it is normally the shortest poles that are best suited.

The oscillation mass that constitutes the intersection wave generator is connected to such poles by a vibrating means which is mounted in a separate house which is then located at the top of the pole. Particular to this method is that it is the first time that equipment has been used which makes it possible to transfer relatively strong intersection waves to the formation and maintain these over a period of time.

When used to search for hydrocarbons in marine environments, the intersection wave generator could produce horizontal polarized intersection waves for use in vertical seismic profiling. Presently, no other methods exist for performing this in a satisfactory way in marine environments.

A further possibility is to put up a number of such poles for mapping a larger part of the underground. Measurements will then normally be performed on the sea bed.

If the poles are put up permanently, the measurements can be repeated after a certain time. Since the position of the poles are known, the seismic measurements can be monitored. This solves the problem with conventional seismic monitoring concerning position and source/amplitude variation.

In situations where there are not a sufficient number of poles in the formation in advance, for attaining the quantitative number that is desired, there is an alternative aspect of the invention to drive down a further number of poles that are needed for an optimum utilization of the invention. Of course, the costs associated with this are not insignificant but, measured against the gain in increased production that can be attained when the formation is exactly mapped, costs will be recouped.

The attempts that secondary is put forth for attaining such gains, are per se not a part of this invention. Only as examples thereof can be mentioned that the invention as secondary gains can be made such as the calibrating of logs for sonic drilling holes which give information about optimum location of injection wells.

In a preferred embodiment of the invention intersection waves are used that are linear horizontal polarized (that is oscillation in the horizontal plane). In addition, the polarization direction can, after some time, change a certain number of degrees, so that it is possible to achieve an overview over the intersection wave velocity as a function of the azimuth. This can so be used for mapping the anisotropic properties of the formation. An important example thereof is the splitting of intersection waves (birefringence) that is present when horizontal polarized intersection waves are reflected from a system of cracks in the underground.

The advantage with linear horizontal polarizing is that no wave conversion to compression waves will occur by an oblique incidence for plane horizontal layer. The horizontal polarized intersection wave will keep their polarization direction both for reflected and transmitted waves. Elliptical polarized intersection waves as described in U.S. Pat. No. 5,128,900 will also keep their polarization direction after reflection and transmission. The disadvantage in using elliptic polarized intersection waves is that it is not possible to use conventional seismic processing equipment for processing the data.

According to another preferred feature of the invention, for further securing the anchoring of the pole to the formation, the pole is equipped with an inner stop plate at a level with the sea bed. This plate will then, together with the lower external walls of the pole, form a "skirt" which ensures that the pole, even when vibrated, does not sink further down into the formation. The need for this securing will vary strongly with the bottom conditions at the location in question. In some places such a skirt will be essential for achieving a durable, stable anchoring to the formation.

Figure 4A:
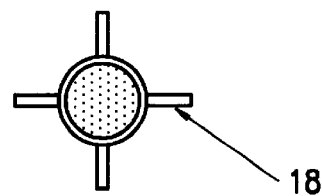
Figure 4:
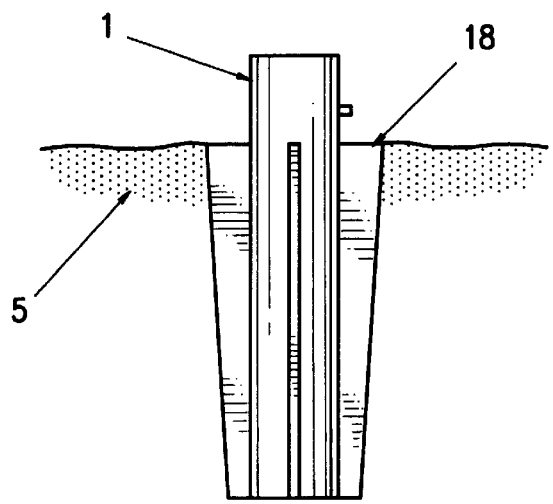

In the following examples of the invention will be described with reference to the accompanying drawings, where FIG. 1 shows a pole/tube in a position before it is driven down into the formation, FIG. 2a shows the same pole after it is driven down into a desired position, FIG. 2b shows a vertical section of the upper segment of the pole shown in FIG. 2a, containing the oscillation mass, FIG. 3 shows a horizontal section of an example of how the oscillating mass can be constructed, FIG. 4 shows a particular embodiment of a pole according to present invention, FIG. 4a is a top plan view of the pole shown in FIG. 4.

Figure 5:
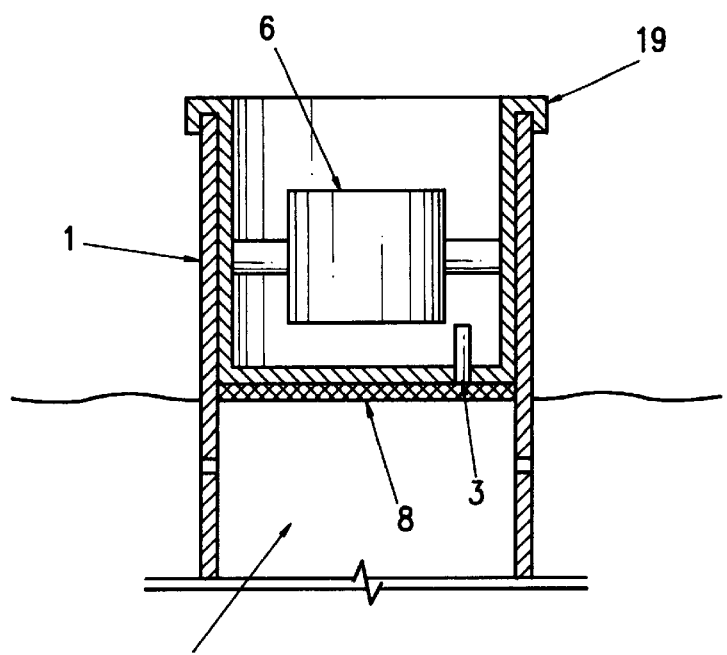
Figure 6:
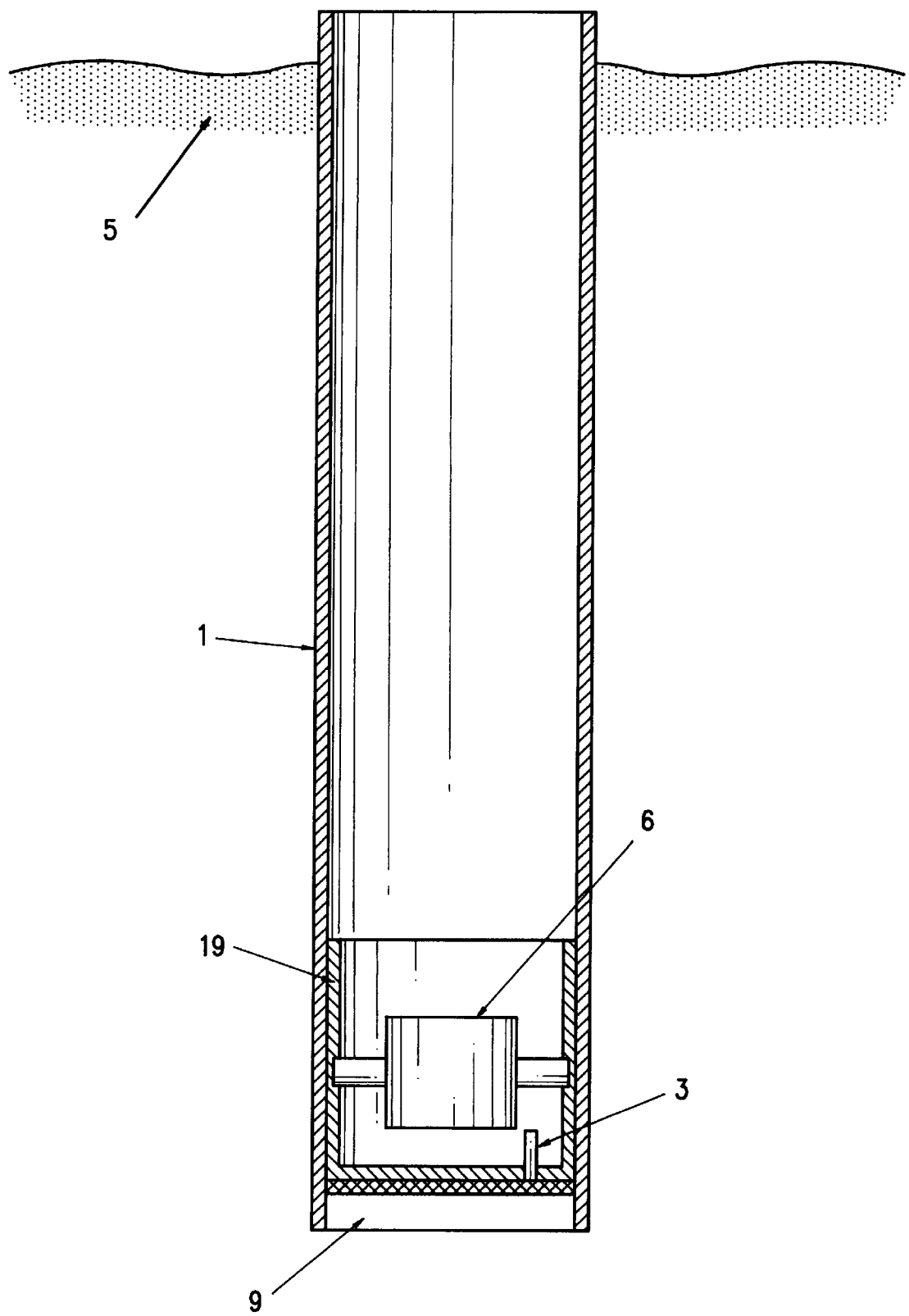
Figure 7:
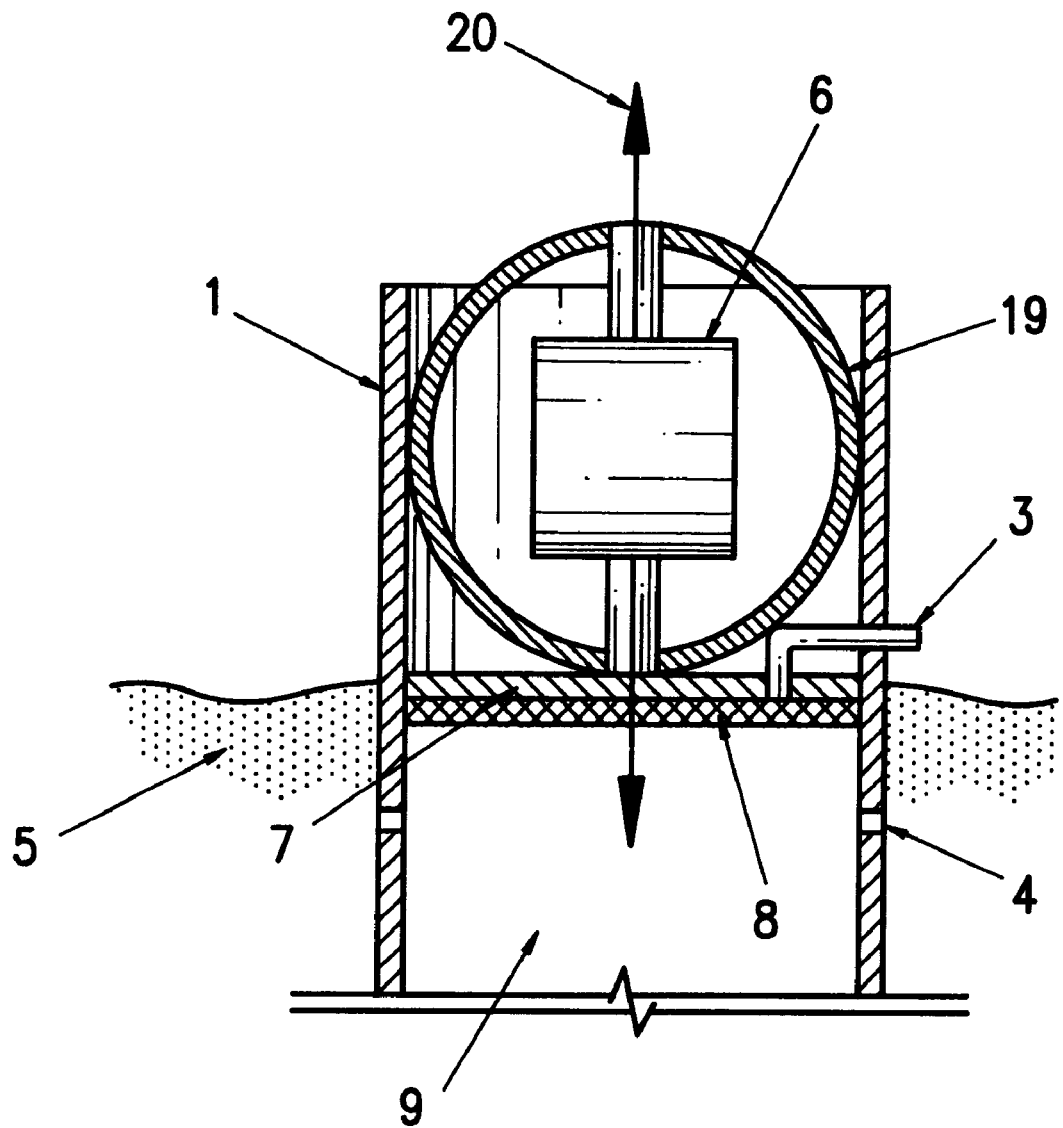

FIG. 5 shows a vertical section of the upper segment of an embodiment where the vibrator is mounted in a separate housing that is located at the top of a previously installed pole, FIG. 6 shows a pole with an alternative location of the oscillation mass, FIG. 7 shows a vibrator element that also can be used for generation of pressure waves.

FIG. 1 illustrates a pole 1 suspended by a suspension means 2 which is used for locating and correctly orienting the pole for introduction/driving into the formation 5. The pole can be equipped with a pipe socket 3 for evacuation and filling, respectively, of water, and perforations with filter 4 allowing transport of fluid from the formation into the tube, and vice versa. The filter inhibits solid particles transported with the water. The pole has a preferably circular cross section, but could also have a different shape. However, it is essential that the pole is a substantially open tube.

FIG. 2a shows the same pole in a down driven condition. It is not shown how the pole is driven down, and this is not a part of the invention. As previously mentioned, a pile driver or a vibrating hammer may be used, but also other techniques can be utilized, as mentioned with reference to FIG. 2b below.

FIG. 2b shows a vertical section of the upper section portion of the pole in FIG. 1 and 2a. The vibrator 6 is suspended so that it can be driven in the horizontal plane in order to generate intersection waves in a plurality of directions. The actual rotation mechanism is not shown. A plate 7 is attached in the interior of the pole at a height that is substantial equivalent to the level of the formation. This plate will, together with the walls downwards of the pole, form a "skirt" which makes it difficult for the pole to sink deeper in the formation than what is desired, even when the sediments are loose and the pole is vibrating. A filter 8 of geotextile or geocomposite can be provided right under the plate 7 in connection with the tube end 3 for preventing solid particles from entering an evacuation pump (not shown), which is used to evacuate water from the room between the sediments and the plate down in the sea bed. The difference in the pressure arising during this process will lead the tube to be pressed into the sea bed. The tube will then be filled with bottom sediments and the vertical movement is stopped when the shut-in water is pumped out and the plate touches the sea bed. If allowed by the sea bed sediments, that is, if they are sufficiently loose or soft, the tube can be installed completely by only using pumping. In the opposite case, extra measures should be taken, as for example using a subsea hammer in a per se known manner. Filters of suitable materials may be located in the openings 4 of the pole, in order to prevent movement of solid particles with the water in to or out from the pole.

FIG. 3 illustrates a schematic section of a suitable generator for intersection waves, of a hydraulic, power-assisted vibrator type. This is not a part of the invention, but is shown for understanding. Hydraulic oil is supplied at 14 and is alternatively lead down to the left and the right, respectively, of the piston 11 which is fixed in relation to the pole by means of connections 17. Since the piston is fixed, the oil pressure in the cylinder 10 hits back and forth in the rhythm determined by the servo valve, and thus transfers intersection forces to the pole, which are horizontally polarized. Typical oscillation mass for such a vibrator can be up to two tons.

The pole shown in FIG. 4 is equipped with radially extending flanges 18 which gives a larger contact area between pole and formation, and will thus further contribute to achieving a stable anchoring of the pole to the formation. This variant can, of course, be combined with the one that contains an inner stop plate.

The invention is, as mentioned, applicable for poles that are already present on the oil field in question. Considering the desired strength of the intersection waves, it pays to use poles that do not have too large a mass in relation to the oscillation mass of the vibrator. FIG. 5 illustrates an embodiment where the vibrator is mounted inside a housing 19, which is located at the top of a previously installed pole. The vibrator housing should be adapted to the pole in which it is to be mounted in advance.

In certain cases, dependant on bottom conditions, it will be more appropriate to locate the vibrator housing 19 and the vibrator near the lowermost distal end tip of the pole 1, as illustrated in FIG. 6, or at an intermediate level between pole end and pole top. The reason for the above variations is to transfer as much energy as possible from the vibrator to the firmer, deeper structure if, for example, the uppermost layer of sediment is very soft. The installation process of pole and vibrator can be achieved by the pole first is penetrated and the enclosed soil is evacuated before the vibrator unit is mounted, or both are installed together as one unit. The latter assumes that the lowermost end is closed and that the sediments are sufficiently soft that penetration can be performed with conventional equipment for use in marine environments.

An appropriate way of monitoring a formation is to let the intersection waves sweep through a defined area of frequency over a certain period, the so-called Vibroseis technique. Information as to of the condition of the formation is achieved by cross correlation of the transmitted signal with the measured signal. Theory for this technique is well known, and is not a part of the invention.

For some purposes it is important to generate intersection and pressure waves from the same position. With reference to FIG. 7, by rotating the vibrator 6 in the horizontal plane, it is possible to get the mass to swing parallel to, and in the longitudinal axis of the pole, so that pressure waves are generated by the pole's lowermost end. This is a great advantage when using the technique in a condition control where draining the reservoir can be localized from the changes in wave velocities as a function of time. Particularly, the velocity of the pressure wave is very sensitive to changes in type of fluid. Furthermore, factors such as reservoir sinking and reservoir cracking can be monitored by means of both intersection waves and pressure waves.

For poles that are located in sand or corresponding loose sediments, a problem can occur in the shape of local over pressure in the pore, in the vicinity of the pole when it is put in vibrations. When there is an over pressure in the pore, the mass in the vicinity of the pole can be loosened, so that the intersection waves are not transferred to the ground in an effective way. In order to counteract this, the evacuating pump can run continuously, so that a lasting under pressure is developed in the tube and to a certain degree outside of it, and a controlled transport of water is achieved from the formation into the tube (pole) through the openings 4 and out through the evacuation pump.

What is claimed is:

1. Method for generating seismic shear waves in an underground formation (5). for mapping of geological resources, in which a tubular pile (1) is installed into the formation which tubular pile (1) is influenced by a force that excites the pile into transversal vibrations which transmit mainly horizontally polarized shear waves into the formation, characterized by a pile (1) with an open tip which allows the pile (1) to be soil-filled with bottom sediments, and in which a plate (7) is situated in the tubular pile (1) at a level that is flush with the formation surface and arranged to prohibit the pile (1) from penetrating further into the formation.

2. Method according to claim 1, characterized by a vibration source (6) that is mounted inside the pile (1) which is capable of turning about the horizontal plane so that it may vibrate along the vertical axis and generate pressure waves at the pile tip.

3. Method according to claim 1, characterized by a vibration source (6) that is mounted inside the pile (1) which enables the source to turn about the vertical axis.

4. Method according to claim 1, characterized by that the transversal vibrations are generated in one horizontal direction during an initial period and then in another horizontal direction to get a best possible picture of the formation (5).

5. Method according to claim 4, characterized by that the said directions are in a given angle to each other.

6. Method for generating seismic shear waves in an underground formation (5) for mapping of geological resources, in which a tubular pile (1) is installed into the formation which tubular pile (1) is influenced by a force that excites the pile into transversal vibrations which transmit mainly horizontally polarized shear waves into the formation, characterized by a pile (1) with an open tip which allows the pile (1) to be soil-filled with bottom sediments, and in which a plate (7) is situated in the tubular pile (1) at a level that is flush with the formation surface and arranged to prohibit the pile (1) from penetrating further into the formation and further characterized by that a negative differential pressure inside the pile (1) is maintained to reduce possible pore water pressure in the formation (5) around the pile (1) during vibration.

* * * * *